(12) United States Patent
Liu et al.

(10) Patent No.: US 11,108,137 B2
(45) Date of Patent: Aug. 31, 2021

(54) COMPACT OMNIDIRECTIONAL ANTENNAS HAVING STACKED REFLECTOR STRUCTURES

(71) Applicant: CommScope Technologies LLC, Hickory, NC (US)

(72) Inventors: Maosheng Liu, Suzhou (CN); Rui An, Suzhou (CN); Martin L. Zimmerman, Chicago, IL (US); Peter J. Bisiules, LaGrange Park, IL (US); ZhaoHui Liu, Suzhou (CN); Ruixin Su, Suzhou (CN); PuLiang Tang, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 15 days.

(21) Appl. No.: 16/738,160

(22) Filed: Jan. 9, 2020

(65) Prior Publication Data

US 2020/0243951 A1 Jul. 30, 2020

(30) Foreign Application Priority Data

Jan. 28, 2019 (CN) .......................... 201910077640.5

(51) Int. Cl.
*H01Q 19/18* (2006.01)
*H01Q 21/06* (2006.01)
(Continued)

(52) U.S. Cl.
CPC ............... *H01Q 1/246* (2013.01); *H01Q 1/42* (2013.01); *H01Q 19/18* (2013.01);
(Continued)

(58) Field of Classification Search
CPC .......... H01Q 1/246; H01Q 1/42; H01Q 19/18; H01Q 21/0025; H01Q 21/062;
(Continued)

(56) References Cited

U.S. PATENT DOCUMENTS 5,771,017 A 6/1998 Dean et al.
9,722,326 B2 8/2017 Chistyakov et al.
(Continued)

FOREIGN PATENT DOCUMENTS

WO 2018/140305 8/2018
WO WO-2018140305 A1 * 8/2018 ............... H01Q 1/42

OTHER PUBLICATIONS

"Datasheet for SBA Smart Omni, Long, 2.3-2.4 GHz, Airspan P/Ns: Tilt 0°: SBAL-2.3-DUAL-1", Airspan Networks Inc., Nov. 2015.
(Continued)

*Primary Examiner* — Hoang V Nguyen
(74) *Attorney, Agent, or Firm* — Myers Bigel, P.A.

(57) ABSTRACT

A base station antenna includes a first reflector structure that extends along a first longitudinal axis, the first reflector structure having a first transverse cross-section, a second reflector structure that extends along a second longitudinal axis, the second reflector structure having a second transverse cross-section that is different from the first transverse cross-section, and the second reflector structure extending above the first reflector structure, a first array of first frequency band radiating elements that are mounted to extend outwardly from the first reflector structure, a second array of second frequency band radiating elements that are mounted to extend outwardly from the second reflector structure, the first frequency band being non-overlapping with the second frequency band, and a radome that extends around the first reflector structure and the second reflector structure.

22 Claims, 10 Drawing Sheets

(51) Int. Cl.
  *H01Q 21/30* (2006.01)
  *H01Q 1/24* (2006.01)
  *H01Q 1/42* (2006.01)
  *H01Q 21/00* (2006.01)
  *H04W 16/28* (2009.01)

(52) U.S. Cl.
  CPC ....... *H01Q 21/0025* (2013.01); *H01Q 21/062* (2013.01); *H04W 16/28* (2013.01); *H01Q 21/30* (2013.01)

(58) Field of Classification Search
  CPC ...... H01Q 21/30; H01Q 21/205; H01Q 21/26; H01Q 25/005; H01Q 5/40; H01Q 15/18; H01Q 19/106
  See application file for complete search history.

(56) References Cited

U.S. PATENT DOCUMENTS

| | | | |
|---|---|---|---|
| 9,917,375 | B2 | 3/2018 | Korva et al. |
| 10,164,346 | B2 | 12/2018 | Ming et al. |
| 10,193,236 | B1 | 1/2019 | Lee et al. |
| 2004/0160374 | A1 | 8/2004 | Johansson et al. |
| 2004/0174317 | A1 | 9/2004 | Dearnley et al. |
| 2004/0263392 | A1 | 12/2004 | Bisiules et al. |
| 2006/0244675 | A1 | 11/2006 | Elliot et al. |
| 2011/0134008 | A1 | 6/2011 | Schadler et al. |
| 2011/0205119 | A1 | 8/2011 | Timofeev et al. |
| 2012/0077504 | A1 | 3/2012 | Schadler et al. |
| 2013/0088404 | A1 | 4/2013 | Ramachandran et al. |
| 2015/0256213 | A1 | 9/2015 | Jan et al. |
| 2015/0303585 | A1 | 10/2015 | Chistyakov et al. |
| 2017/0085289 | A1 | 3/2017 | Jan et al. |
| 2018/0227775 | A1 | 8/2018 | Bisiules et al. |
| 2019/0028159 | A1 | 1/2019 | Bisiules et al. |

OTHER PUBLICATIONS

Bernhard Schulz, "LTE Transmission Modes and Beamforming", White Paper, Rohde & Schwarz, Jul. 2015.
Chuck Powell, "Technical Analysis: Beamforming vs. MIMO Antennas", White Paper, Radio Frequency Systems, Mar. 2014.
U.S. Appl. No. 15/679,450, filed Aug. 17, 2017; Inventor: Martin L. Zimmerman; Entitled: Small Cell Beam-Forming Antennas.
Extended European Search Report corresponding to European Patent Application No. 20153877.4 (11 pages) (dated Jun. 3, 2020).

* cited by examiner

US 11,108,137 B2

COMPACT OMNIDIRECTIONAL ANTENNAS HAVING STACKED REFLECTOR STRUCTURES

CROSS-REFERENCE TO RELATED APPLICATION

The present application claims priority under 35 U.S.C. § 119 to Chinese Patent Application Serial No. 201910077640.5, filed Jan. 28, 2019, the entire content of which is incorporated herein by reference.

FIELD

The present invention relates to cellular communications systems and, more particularly, to base station antennas for small cell cellular base stations.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 2-20 kilometers from the base station. The base station may include baseband equipment, radios and antennas that are configured to provide two-way radio frequency ("RF") communications with fixed and mobile subscribers ("users") that are positioned throughout the cell. The antennas are often mounted on a tower, with the radiation beam ("antenna beam") that is generated by each antenna directed outwardly. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have been deploying so-called "small cell" cellular base stations. A small cell base station refers to a low-power base station that may operate in the licensed and/or unlicensed frequency spectrum that has a smaller range than a typical "macro cell" base station. A small cell base station may be designed to serve users who are within a small geographic region (e.g., an area having a radius of tens or hundreds of meters). Small cells may be used, for example, to provide cellular coverage to high traffic areas within a macro cell, which allows the macro cell base station to offload much or all of the traffic in the vicinity of the small cell base station. Small cell base stations typically employ an antenna that provides full 360 degree coverage in the horizontal "azimuth" plane and a suitable beamwidth in the vertical "elevation" plane to cover the designed area of the small cell. The antennas on the small cell base stations may be designed to have a small downtilt in the elevation plane to reduce spill-over of the antenna beams formed thereby into regions that are outside the small cell and also for reducing interference between the small cell and the overlaid macro cell.

FIG. 1A is a schematic diagram of a conventional small cell base station 10. As shown in FIG. 1A, the base station 10 includes an antenna 20 that may be mounted on a raised structure 30. The antenna 20 may have an omnidirectional antenna pattern in the azimuth plane, meaning that the antenna beam(s) generated by the antenna 20 may extend through a full 360 degree circle in the azimuth plane.

As is further shown in FIG. 1A, the small cell base station 10 also includes base station equipment such as baseband units 40 and radios 42. A single baseband unit 40 and a single radio 42 are shown in FIG. 1A to simplify the drawing. Additionally, while the radio 42 is shown as being co-located with the baseband equipment 40 at the bottom of the antenna tower 30, it will be appreciated that in other cases the radio 42 may be a remote radio head that is mounted on the antenna tower 30 adjacent the antenna 20. The baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 20 for transmission via a cabling connection 44. The base station 10 of FIG. 1A will typically include various other equipment (not shown) such as, for example, a power supply, back-up batteries, a power bus and the like.

FIG. 1B is a composite of several views of an antenna beam 50 having an omnidirectional pattern in the azimuth plane that may be generated by the antenna 20. FIG. 1B includes a perspective three-dimensional view of the antenna beam 50 (labelled "3D pattern") as well as plots of the azimuth and elevation patterns thereof. The azimuth pattern is generated by taking a horizontal cross-section through the middle of the three dimensional antenna beam 50, and the elevation pattern is generated by taking a vertical cross-section through the middle of the three dimensional beam 50. As can be seen, the antenna beam 50 extends through a full 360 degrees in the azimuth plane, and the antenna beam 50 may have a nearly constant gain in all directions in the azimuth plane. In the elevation plane, the antenna beam 50 has a high gain at elevation angles close to the horizon (e.g., elevation angles between −10° and 10°), but the gain drops off dramatically at larger elevation angles above and below the horizon. The antenna beam 50 thus is omnidirectional in the azimuth plane and directional in the elevation plane.

FIG. 2A is a schematic diagram illustrating a conventional small cell base station antenna 100 that forms four antenna beams having peanut-shaped azimuth patterns to provide small cell coverage with MIMO capabilities. The antenna 100 is disclosed in U.S. Patent Publication No. 2018/0227775 ("the '775 publication"), published Aug. 9, 2018, the entire content of which is incorporated herein by reference. A peanut-shaped azimuth pattern refers to an antenna pattern having a bi-lobed cross-section through the azimuth plane, where the two lobes extend away from the antenna in opposite directions. As shown in FIG. 2A, the small cell base station antenna 100 includes a tubular reflector assembly 110 having a rectangular transverse cross-section. Each face 114 of the reflector assembly 110 may comprise a backplane 112-1 through 112-4. The base station antenna 100 includes a total of four linear arrays 120-1 through 120-4 of radiating elements 122 that are mounted on the respective backplanes 112. Each backplane 112 may comprise, for example, a reflector that serves as a ground plane for the radiating elements 122. Each linear array 120 may be oriented vertically with respect to the horizon when the base station antenna 100 is mounted for use. Each radiating element 122 may be a cross-polarized radiating element that includes a first dipole radiator that radiates RF energy at a slant −45° polarization and a second dipole radiator that radiates RF energy at a slant +45° polarization. The base station antenna 100 further includes a radome 102 that covers and protects the radiating elements 122. It should be noted that herein, when multiple like or similar elements are provided, they may be labelled in the drawings using a two-part reference numeral (e.g., linear array 120-1). Such elements may be referred to herein individually by their full reference numeral (e.g., face 214-2) and may be referred to collectively by the first part of their reference numeral (e.g., the linear arrays 120).

The base station antenna 100 has four RF ports (not shown). The first RF port is connected to the −45° dipole radiators of the radiating elements 122 of the first and third linear arrays 120-1, 120-3, which are mounted on opposed backplanes 112-1, 112-3. The second RF port is connected to the −45° dipole radiators of the radiating elements 122 of the second and fourth linear arrays 120-2, 120-4, which are mounted on opposed backplanes 112-2, 112-4. The third RF port is connected to the +45° dipole radiators of the radiating elements 122 of the first and third linear arrays 120-1, 120-3. Finally, the fourth RF port is connected to the +45° dipole radiators of the radiating elements 122 of the second and fourth linear arrays 120-2, 120-4. FIG. 2B is a graph illustrating simulated antenna beams (in the azimuth plane) generated by the first RF port and the second RF port. As shown in FIG. 2B, the −45° radiators of the radiating elements 122 included in the first and third linear arrays 120-1, 120-3 together form a first antenna beam 104-1 that has a peanut-shaped cross-section in the azimuth plane. Likewise, the −45° radiators of the radiating elements 122 included in the second and fourth linear arrays 120-2, 120-4 together form a second antenna beam 104-2 that also has a peanut-shaped cross-section in the azimuth plane. Together, the antenna beams 104-1, 104-2 can provide omnidirectional coverage in the azimuth plane.

DETAILED DESCRIPTION

Figure 1A:
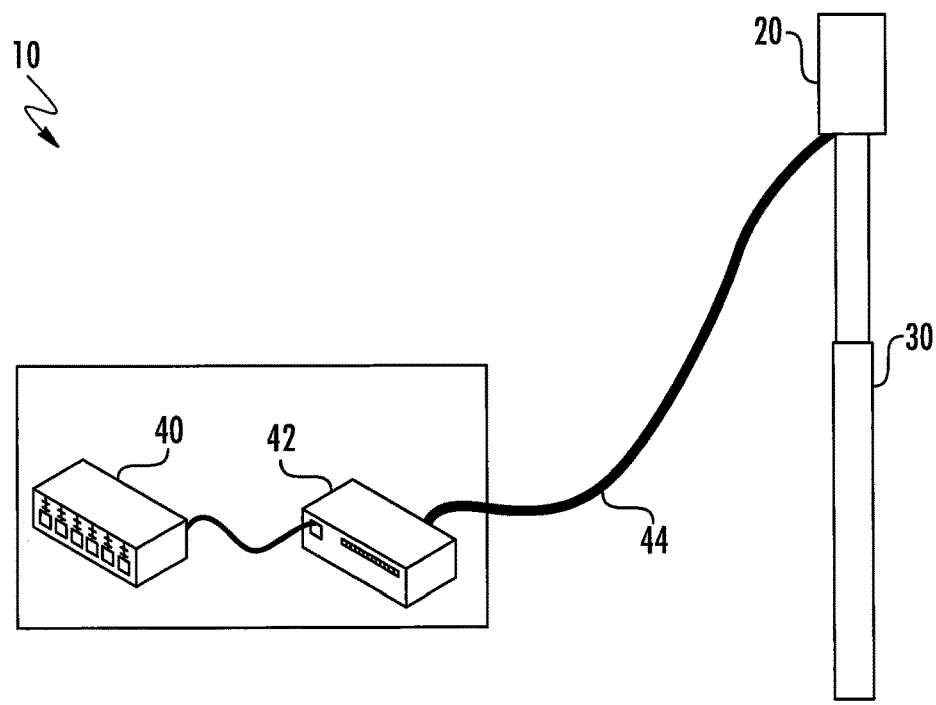
FIG. 1A is a simplified schematic diagram illustrating a conventional small cell cellular base station.
Figure 1B:
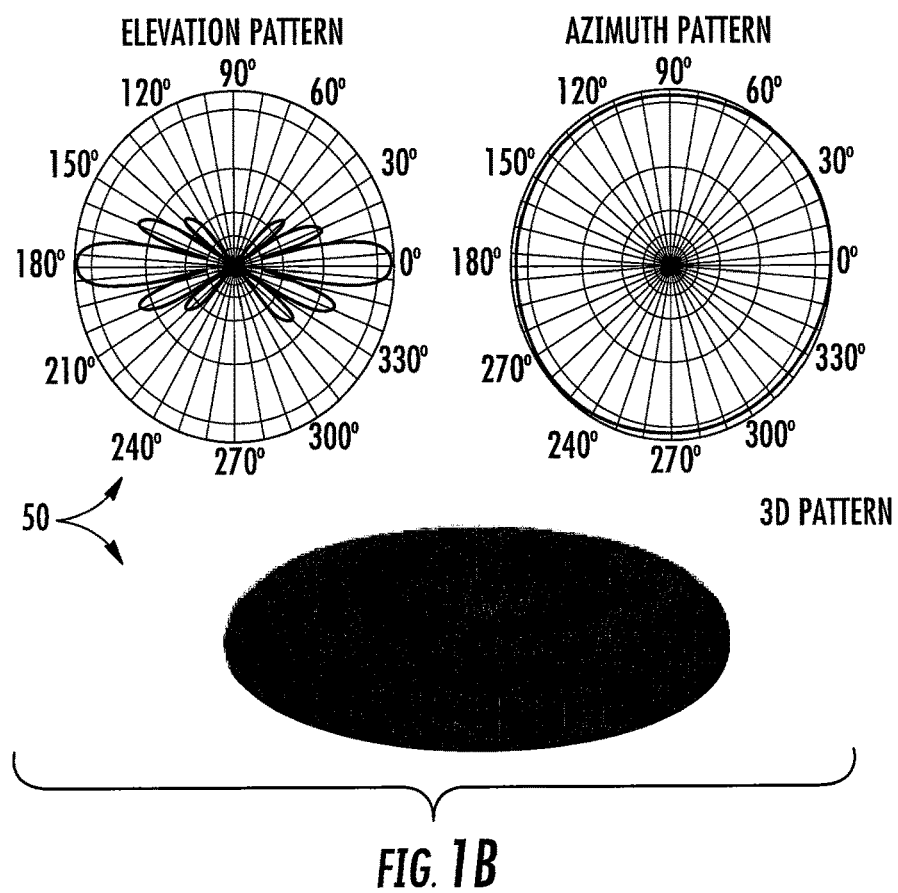
FIG. 1B provides several views of an antenna beam that may be generated by the antenna of the conventional small cell base station of FIG. 1A.

With the roll-out of fifth generation cellular networks, cellular operators are now interested in small cell base station antennas that include linear arrays of radiating elements that operate in two, three, four or more different frequency bands. Cellular operators, however, also often have strict requirements on the form-factor of a small cell antenna, such as limits on the diameter, height and/or volume of the antenna. It can be challenging to design small cell antennas that provide service in two, three, four or more different frequency bands while also meeting the form-factor requirements specified by cellular operators.

Pursuant to embodiments of the present invention, small cell antennas are provided that have reflector assemblies that include multiple, vertically-stacked tubular reflector structures that have different horizontal (transverse) cross-sections. The stacked reflector structures may facilitate mounting linear arrays of radiating elements that operate in different frequency bands in a more compact arrangement. The linear arrays may be arranged on the stacked tubular reflector structures in a manner that provides desirable antenna beam shapes for each of the different frequency bands while allowing the antenna to meet, for example, relatively strict requirements for the diameter, height and/or volume of the antenna. The stacked tubular reflector structures may also provide increased mechanical strength, additional room for internal components of the antenna, and/or improved cable routing paths as compared to alternative antenna designs that use a single tubular reflector structure.

In some embodiments, the small cell antenna may include a first set of four arrays of radiating elements that are mounted on four main faces of a first tubular reflector structure. The first and third arrays may be mounted on opposed faces of the first tubular reflector structure and may be commonly fed to generate a first antenna beam that has a peanut-shaped cross-section in the azimuth plane. The second and fourth arrays may be mounted on two other opposed faces of the first tubular reflector structure and may be commonly fed to generate a second antenna beam that also has a peanut-shaped cross-section in the azimuth plane. The second antenna beam may have substantially the same shape as the first antenna beam and may be rotated approximately ninety degrees with respect to the first antenna beam in the azimuth plane. Together, the first and second antenna beams may provide omnidirectional coverage in the azimuth plane. The small cell antenna may further include a second set of four arrays of radiating elements that are mounted on four main faces of a second tubular reflector structure. The four arrays of the second set of arrays may be mounted and fed in the same manner as the first set of arrays to generate first and second antenna beams that have peanut-shaped cross-sections in the azimuth plane, and that together provide omnidirectional coverage in the azimuth plane.

In some embodiments, the small cell base station antenna may include a first tubular reflector structure that has a rectangular transverse cross-section and a second tubular reflector structure that has an octagonal transverse cross-section. The rectangular transverse cross-section of the first tubular reflector structure may have a first perimeter and the octagonal transverse cross-section of the second tubular reflector structure may have a second perimeter that is larger than the first perimeter. In some embodiments, the second perimeter may be at least 50% larger than the first perimeter. In other embodiments, the second perimeter may be at least twice as large as the first perimeter. Linear arrays of radiating element that operate in a first frequency band may be mounted on at least two of the faces of the first tubular reflector structure having the rectangular transverse cross-section, while linear arrays of radiating element that operate in a second frequency band may be mounted on at least four of the sides of the second tubular reflector structure having the octagonal transverse cross-section. The first frequency band may be, for example, a low frequency band (e.g., some or all of the 544-960 MHz frequency band) and the second frequency band may be, for example, a mid-range frequency band (e.g., some or all of the 1.427-2.696 GHz frequency band).

In other embodiments, the small cell base station antenna may include a first tubular reflector structure that has a first transverse cross-section and a second tubular reflector structure that has a second transverse cross-section that is different in size and/or shape from the first transverse cross-section. The first and second reflector structures may be vertically stacked. Linear arrays of radiating elements that operate in a first frequency band may be mounted on at least two of the faces of the first tubular reflector structure while linear arrays of radiating element that operate in a second frequency band may be mounted on at least two of the faces of the second tubular reflector structure. In one example embodiment, the first reflector structure may have a rectangular or octagonal transverse cross-section, and the second reflector structure may have an octagonal transverse cross-section. A radome may surround both reflector structures.

In some embodiments, a first perimeter of the first transverse cross-section may be different than a second perimeter of the second transverse cross-section. In embodiments where the second frequency band is higher than the first frequency band, the second perimeter may be larger than the first perimeter. The antennas may also include linear arrays of radiating element that operate in a third frequency band that is higher than either the first frequency band or the second frequency band. In some embodiments, these linear arrays may be mounted on the first reflector structure.

In other embodiments, base station antennas may be provided that include a first array of first frequency band radiating elements and a second array of second frequency band radiating elements that are offset from each other along a longitudinal axis of the antenna. The first frequency band radiating elements are a first distance from the longitudinal axis and the second frequency band radiating elements are a second, larger, distance from the longitudinal axis the first distance. The second frequency band is different from the first frequency band and, in some embodiments, may be at higher frequencies.

In other embodiments, base station antennas may be provided that include a first reflector structure having first and second generally opposed sides, a first array of radiating elements that are mounted to extend outwardly from the first side of the first reflector structure and a second array of radiating elements that are mounted to extend outwardly from the second side of the first reflector structure, a second reflector structure having third and fourth generally opposed sides, and a third array of radiating elements that are mounted to extend outwardly from the third side of the second reflector structure and a fourth array of radiating elements that are mounted to extend outwardly from the fourth side of the second reflector structure. In these antennas, the first side may be a first distance from the second side and the third side may be a second distance from the fourth side, where the second distance is different from the first distance.

In still other embodiments, base station antennas may be provided that include a first reflector structure that extends along a first longitudinal axis and that has a transverse cross-section having a first perimeter, a plurality of arrays of first frequency band radiating elements that are mounted to extend outwardly from respective sides of the first reflector structure, a second reflector structure that extends along a second longitudinal axis and that has a transverse cross-section having a second perimeter that is different from the first perimeter, and a plurality of arrays of second frequency band radiating elements that are mounted to extend outwardly from respective sides of the second reflector structure. In these antenna, the first and second frequency band radiating elements may be different from each other and may be configured to operate in different frequency bands.

Example embodiments of the invention will now be discussed in more detail with reference to the attached drawings.

With the introduction of various fourth generation ("4G") and fifth generation ("5G") cellular technologies, base stations are employing antennas that have multi-input-multi-output ("MIMO") capabilities. As known to those of skill in the art, MIMO refers to a technique in which a data stream is split up and used to generate a plurality of RF signals that are output through multiple ports of a radio and transmitted through multiple different antenna arrays (or sub-arrays) that are, for example, spatially separated from one another and/or at orthogonal polarizations. The RF signals are recovered at a receive antenna where they are demodulated and recombined to recreate the original data stream. Natural multipath propagation techniques based on spatial and/or polarization diversity are exploited so that the RF signals may be transmitted at the same frequency. The use of MIMO transmission techniques may help overcome the negative effects of multipath fading, reflections of the transmitted signal off of buildings and the like to provide enhanced transmission quality and capacity.

Small cell base stations are often implemented in high-density urban environments. These environments may have numerous buildings which make these environments natural applications for using MIMO transmission techniques. MIMO is typically employed in 4G applications because, while more expensive, the added capacity typically justifies the increased cost. If the costs of MIMO capable base station antennas can be reduced, then the benefits of using MIMO transmission techniques in terms of network capacity as a function of capital expense may be further increased.

A base station antenna that operates (for a particular frequency band) as a P×MIMO antenna refers to a base station antenna that splits a data stream into P parts, where P is a positive integer greater than 1, and transmits the P parts via different antenna arrays and/or at different polarizations. Thus, for example, a base station antenna that is designed to operate as a 4×MIMO antenna in a first frequency band will typically have two arrays of dual-polarized radiating elements, which allow the antenna to generate two antenna beams (i.e., one for each array) at each of two orthogonal polarizations, providing a total of four antenna beams for transmitting four separate data streams. As noted above, there is demand for small cell base station antennas that operate in two, three, four or more different frequency bands, where each frequency band implements 2×MIMO or 4×MIMO. Such small cell base station antenna thus require a large number of linear arrays of different sized radiating elements (since the size of the radiating elements differs as a function of frequency). It may be difficult to design and implement base station antennas that provide such capabilities while also keeping the form factor of the antenna within the constraints required by many cellular operators.

Figure 3A:
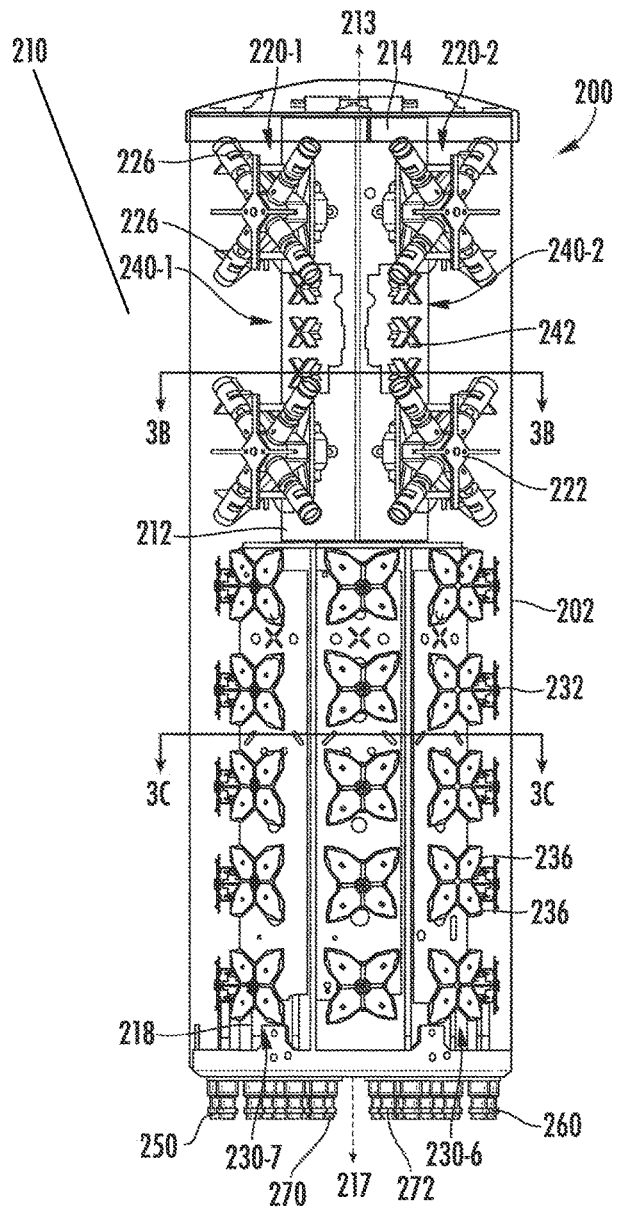
FIG. 3A is a schematic front view of a small cell base station antenna according to embodiments of the present invention with the front half of the radome thereof removed.
Figure 3B:
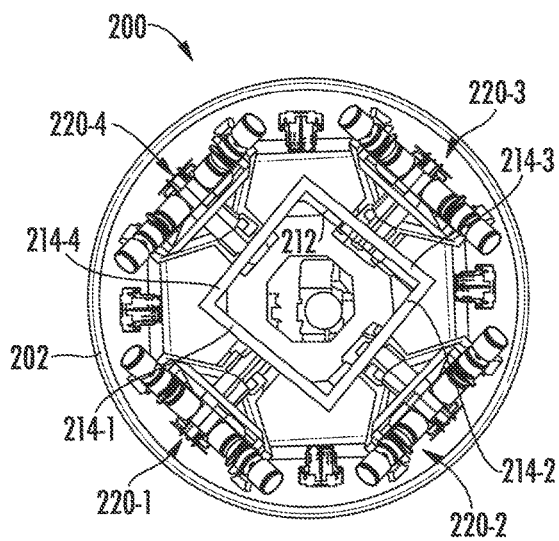
FIGS. 3B and 3C are schematic cross-sectional views taken along lines 3B-3B and 3C-3C of FIG. 3A, respectively.
Figure 3C:
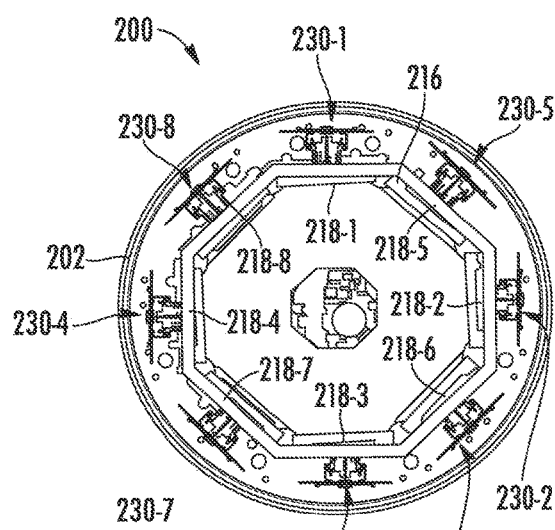
Figure 3D:
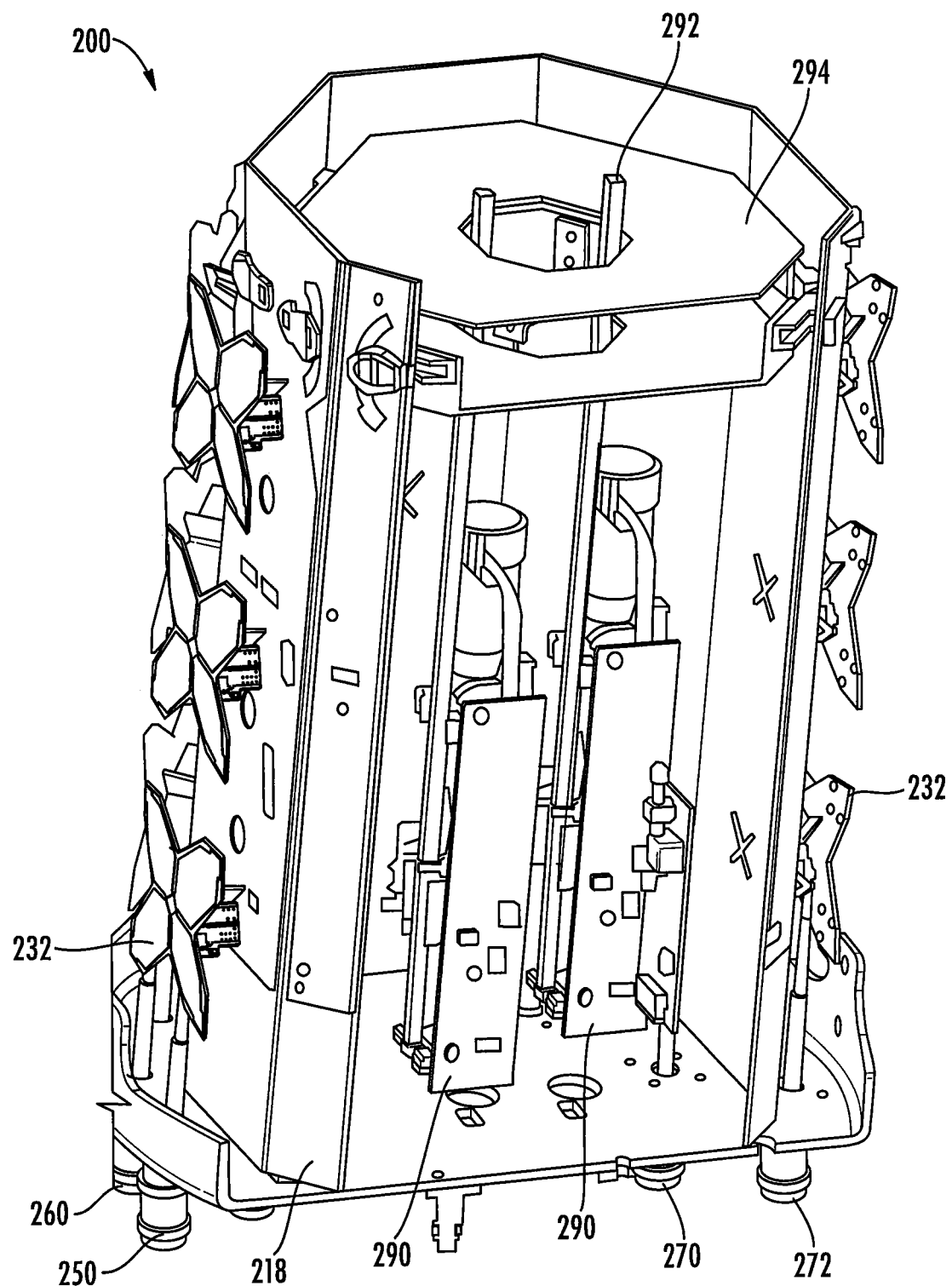
FIG. 3D is a perspective cross-sectional view of a portion of the antenna of FIG. 3A.
Figure 4A:
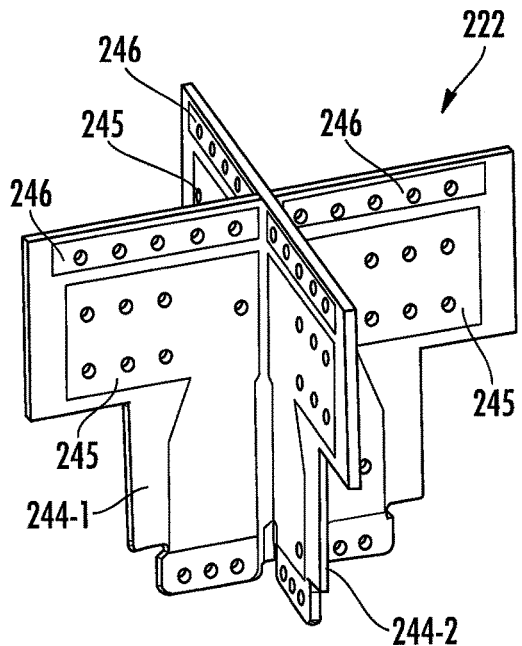
FIGS. 4A-4D are various views of a high-band radiating element included in the antenna of FIGS. 3A-3D.
Figure 4B:
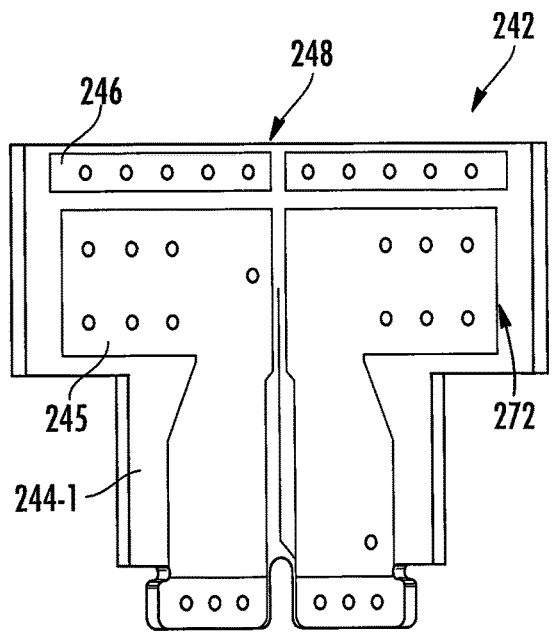
Figure 4C:
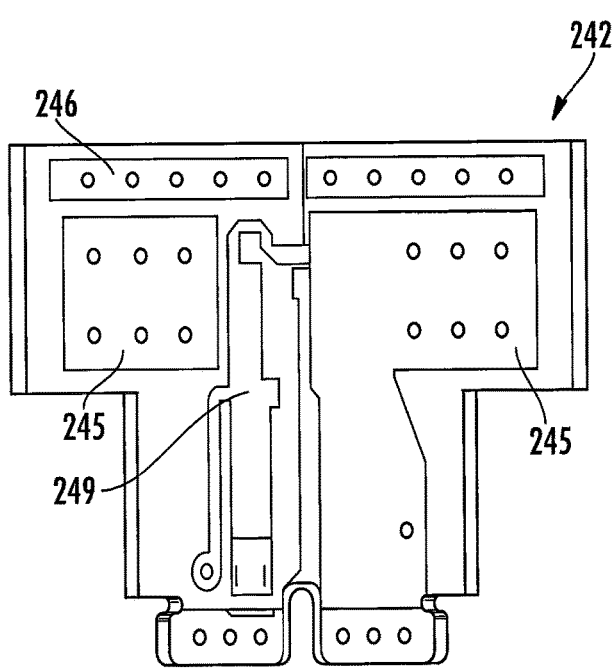
Figure 4D:
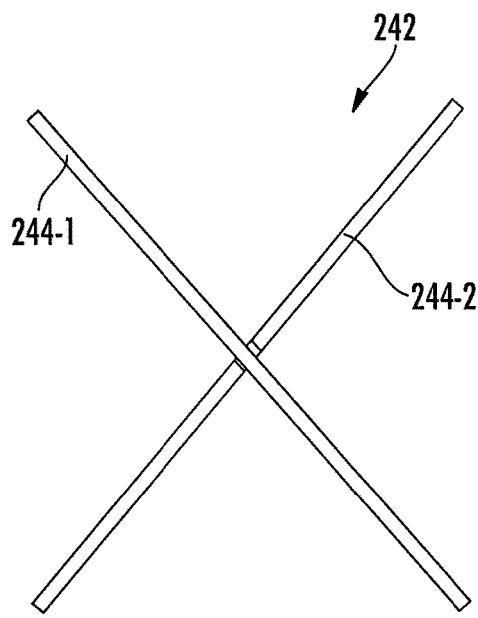

FIGS. 3A-3D are various views illustrating a base station antenna 200 according to embodiments of the present invention. In particular, FIG. 3A is a schematic front perspective view of the base station antenna 200 with the front half of the radome removed, while FIGS. 3B and 3C are cross-sectional views taken along lines 3B-3B and 3C-3C of FIG. 3A. FIG. 3D is a perspective cross-sectional view of a portion of the base station antenna 200 of FIG. 3A.

As shown in FIG. 3A, the base station antenna 200 includes a reflector assembly 210 that includes a first tubular reflector structure 212 and a second tubular reflector structure 216. The first tubular reflector structure 212 extends along a first longitudinal axis 213 and has a rectangular transverse cross-section. Thus, the first tubular reflector structure 212 has four main faces 214-1 through 214-4. The second tubular reflector structure 216 extends along a second longitudinal axis 217 and has an octagonal transverse cross-section. Thus, the second tubular reflector structure 216 has eight main faces 218-1 through 218-8. The first longitudinal axis 213 and the second longitudinal axis 217 may be collinear.

The small cell antenna 200 includes arrays of radiating elements that operate in a variety of different frequency bands. In particular, the antenna 200 includes four low-band arrays 220 of low-band radiating elements 222 that operate in some or all of the 544-960 MHz frequency band. As shown in FIGS. 3A-3C, each low-band array 220 may comprise a linear array of two vertically stacked low-band radiating elements 222. The antenna 200 further includes eight mid-band arrays 230 of mid-band radiating elements 232 that operate in some or all of the 1427-2696 MHz frequency band. As shown in FIGS. 3A-3C, each mid-band array 230 may comprise a linear array of five vertically stacked mid-band radiating elements 232. The antenna 200 further includes four high-band arrays 240 of high-band radiating elements 242. The high-band radiating elements 242 may, for example, be configured to operate in some of all of the 3.3-4.2 GHz frequency band (referred to herein as the 3.5 GHz band), and/or may be configured to operate in some of all of the 5.1-5.3 GHz frequency band (referred to herein as the 5 GHz band). As will be explained in further detail below, in the depicted embodiment the high-band radiating elements are dual frequency band radiating elements that are configured to operate in some or all of both the 3.5 GHz and 5 GHz frequency bands. As shown in FIGS. 3A-3C, each high-band array 240 may comprise a linear array of three vertically stacked high-band radiating elements 242. Base station antenna 200 may further include a radome 202 that covers and protects the radiating elements 222, 232, 242 and other components of the base station antenna 200.

While the base station antenna 200 illustrates one example embodiment, it will be appreciated numerous changes may be made thereto. For example, in other embodiments, only two of different types of linear arrays 220, 230, 240 may be provided (e.g., low-band and mid-band, mid-band and high-band, or low-band and high-band). As another example, the number of linear arrays 220, 230, 240 of each type may be varied, or the number of radiating elements 222, 232, 242 that are included in each type of linear array 220, 230, 240 may be varied (including arrays having a single radiating element). It will also be appreciated that any appropriate radiating elements 222, 232, 242 may be used including, for example, dipole, cross-dipole and/or patch radiating elements.

The low-band radiating elements 222 of the four low-band linear arrays 220 are mounted to extend forwardly from the respective four main faces 214 of the first tubular reflector structure 212 that has a rectangular transverse cross-section. Each main face 214 of the first tubular reflector structure 212 may comprise a backplane that serves, for example, as a reflector and as a ground plane for the low-band radiating elements 222 mounted thereon. The first tubular reflector structure 212 may comprise a unitary structure or may comprise a plurality of structures that are attached together. Each low-band linear array 220 is oriented vertically with respect to the horizon when the base station antenna 200 is mounted for use. In the depicted embodiment, each low-band radiating element 222 includes a pair of dipole radiators 226 that are arranged orthogonally to each other at angles −45° and the +45° with respect to the longitudinal (vertical) axis of the antenna 200.

The mid-band radiating elements 232 of the eight mid-band linear arrays 230 are mounted to extend forwardly from the respective eight main faces 218 of the second tubular reflector structure 216 that has an octagonal transverse cross-section. Each main face 218 of the second tubular reflector structure 216 may comprise a backplane that serves, for example, as a reflector and as a ground plane for the mid-band radiating elements 232 mounted thereon. The second tubular reflector structure 216 may comprise a unitary structure or may comprise a plurality of structures that are attached together. Each mid-band linear array 230 is oriented vertically with respect to the horizon when the base station antenna 200 is mounted for use. In the depicted embodiment, each mid-band radiating element 232 includes a pair of dipole radiators 236 that are arranged orthogonally to each other at angles −45° and the +45° with respect to the longitudinal (vertical) axis of the antenna 200.

The high-band radiating elements 242 of the four high-band linear arrays 240 are mounted to extend forwardly from the respective four main faces 214 of the first tubular reflector structure 212. Each high-band linear array 240 is oriented vertically with respect to the horizon when the base station antenna 200 is mounted for use. Each high-band radiating element 242 is configured to transmit and receive signals in two different frequency bands. In the depicted embodiment, each high-band radiating element 242 includes a first pair of dipole radiators 245 that are arranged orthogonally to each other at angles −45° and the +45° with respect to the longitudinal (vertical) axis of the antenna 200 and a second pair of dipole radiators 246 that are similarly arranged. In the depicted embodiment, each high-band radiating element 242 is a cross-polarized radiating element that is configured to transmit and receive signals at two orthogonal polarizations (namely −45° and the +45° linear polarizations) in each frequency band.

FIGS. 4A-4D are various views of one of the high-band radiating elements 242. As shown in FIGS. 4A-4D, each high-band radiating element 242 may be formed using a pair of printed circuit boards 244-1, 244-2. Each printed circuit board 244 includes a 3.5 GHz dipole arm 245 and a 5 GHz dipole arm 246. The 5 GHz dipole arms 246 are located outwardly of the 3.5 GHz dipole arms 245 when the high-band radiating element 242 is mounted for use. The two 3.5 GHz dipole arms 245 on printed circuit board 244-1 form a first 3.5 GHz dipole radiator 247 that transmits and receives signals at the −45° polarization, and the two 3.5 GHz dipole arms 245 on printed circuit board 244-2 form a second 3.5 GHz dipole radiator 247 that transmits and receives signals at the +45° polarization. Likewise, the two 5 GHz dipole arms 246 on printed circuit board 244-1 form a first 5 GHz dipole radiator 248 that transmits and receives signals at the −45° polarization, and the two 5 GHz dipole arms 246 on printed circuit board 244-2 form a second 5 GHz dipole radiator 248 that transmits and receives signals at the +45° polarization. The 3.5 GHz dipole arms 245 are directly driven through respective baluns 249. When a 3.5 GHz signal is input to a balun 249, it is fed directly to the 3.5 GHz dipole arms 245. When a 5 GHz signal is input to the balun 249, the energy electromagnetically couples to the 5 GHz dipole arms 246 which then resonate at 5 GHz.

Figure 5:
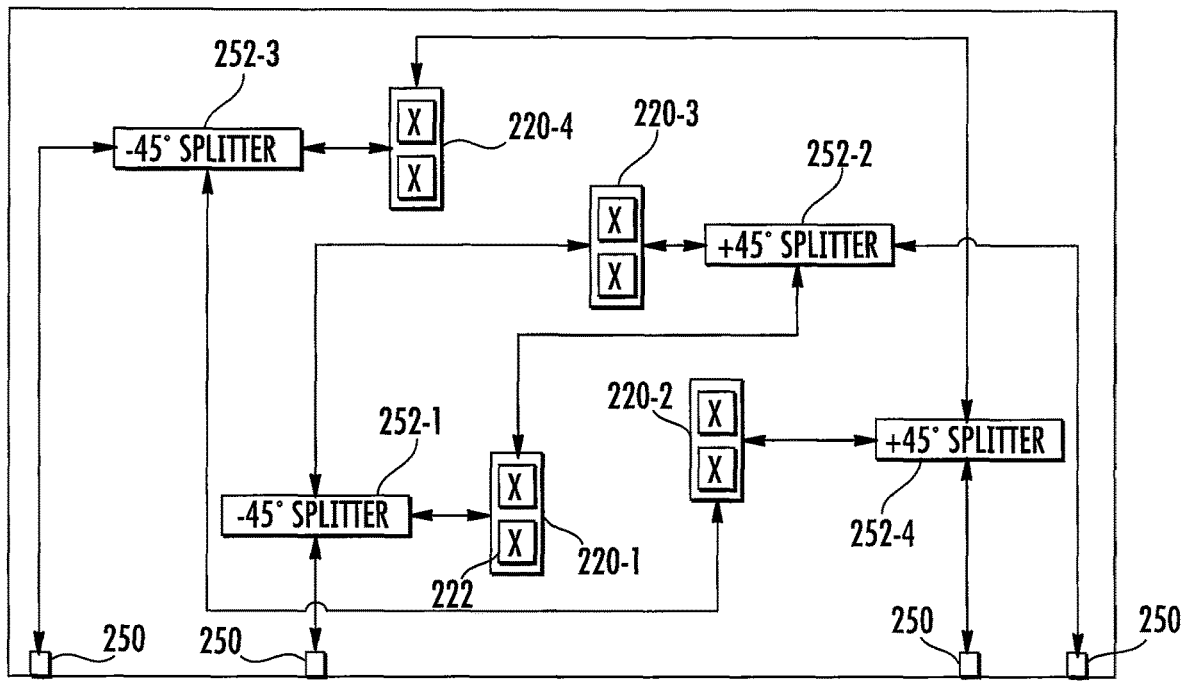
FIGS. 5-7 are block diagrams illustrating feed networks that may be included in the base station antenna of FIGS. 3A-3D.

FIG. 5 is a block diagram illustrating the feed network for the low-band arrays 220. As shown in FIG. 5, the base station antenna 200 includes four low-band RF ports 250. These low-band RF ports 250 are connected to four respective ports of a low-band radio (not shown). Duplexing of the transmit and receive channels is performed internal to the radio, so each port on the low-band radio passes both transmitted and received RF signals.

As shown in FIG. 5, each RF port 250 is coupled to a respective 1×2 power splitter/combiner 252. Each 1×2 power splitter/combiner 252 is connected to two of the low-band linear arrays 220, where the linear arrays 220 are on opposed main faces of the first tubular reflector structure 212. In particular, power splitter/combiner 252-1 is coupled to the −45° dipole radiators of the radiating elements 222 of linear arrays 220-1 and 220-3, power splitter/combiner 252-2 is coupled to the +45° dipole radiators of the radiating elements 222 of linear arrays 220-1 and 220-3, power splitter/combiner 252-3 is coupled to the −45° dipole radiators of the radiating elements 222 of linear arrays 220-2 and 220-4, and power splitter/combiner 252-4 is coupled to the +45° dipole radiators of the radiating elements 222 of linear arrays 220-2 and 220-4.

Figure 2A:
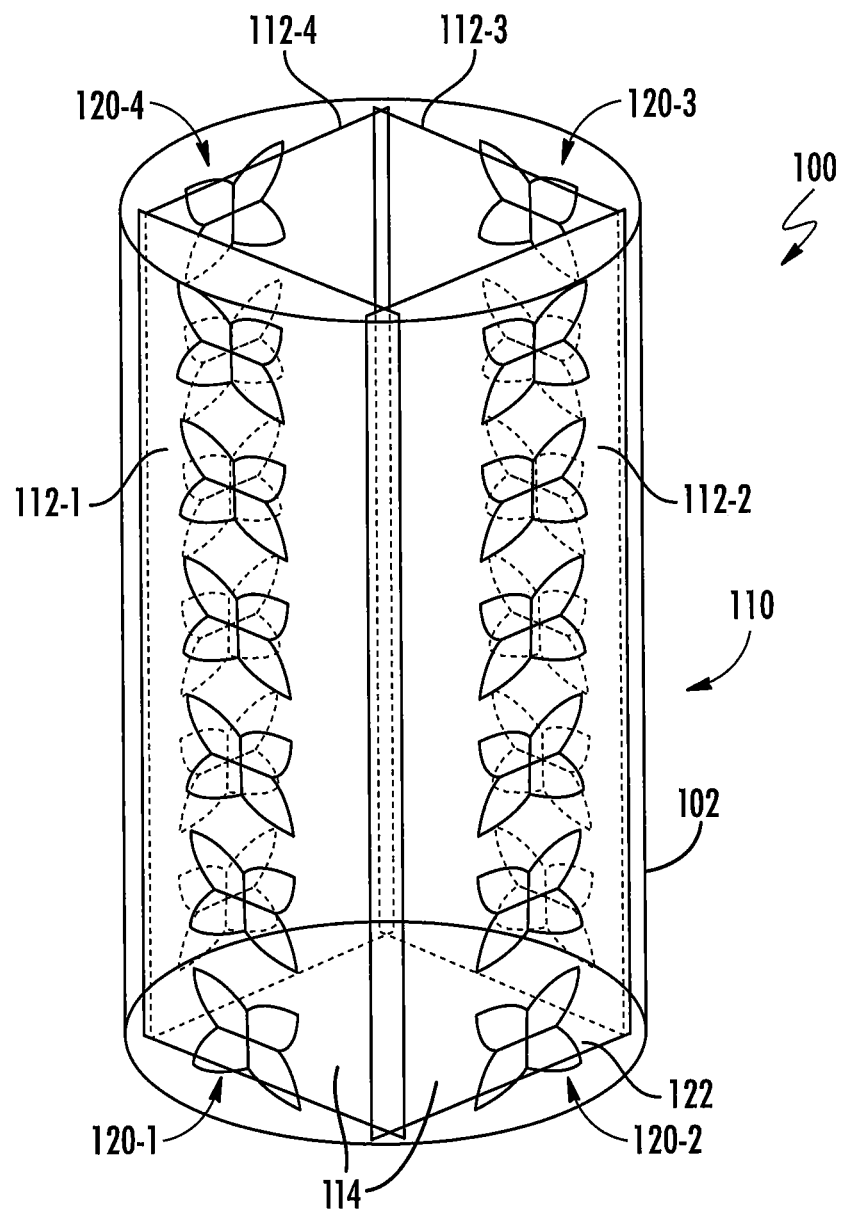
FIG. 2A is a schematic diagram illustrating a conventional small cell base station antenna that generates antenna beams having peanut-shaped azimuth patterns.
Figure 2B:
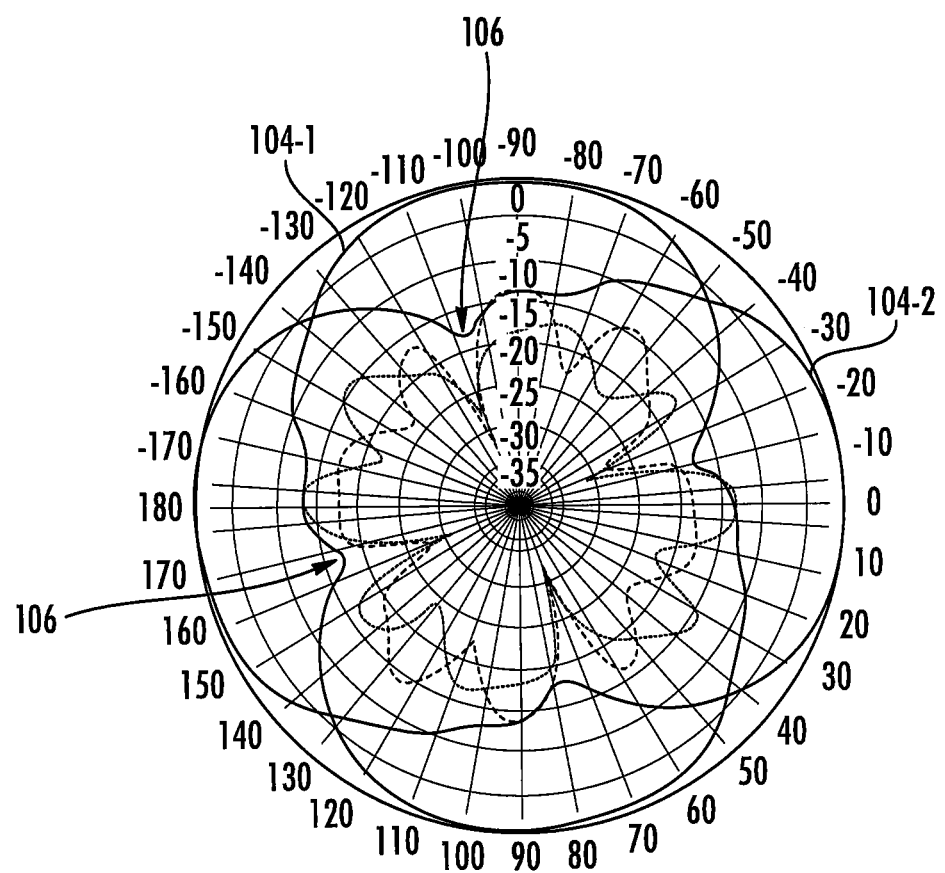
FIG. 2B is a graph illustrating the simulated azimuth pattern of two of the antenna beams generated by the small cell antenna of FIG. 2A.

When the base station antenna 200 is fed in the manner discussed above with reference to FIG. 5, the antenna 200 may generate two distinct low-band antenna beams at each of two polarizations for a total of four antenna beams. In particular, a first −45° polarization antenna beam is generated by linear arrays 220-1 and 220-3 and a second −45° polarization antenna beam is generated by linear arrays 220-2 and 220-4. Likewise, a first +45° polarization antenna beam is generated by linear arrays 220-1 and 220-3 and a second +45° polarization antenna beam is generated by linear arrays 220-2 and 220-4. Based on the pointing direction of the linear arrays 220, each antenna beam may have a generally peanut-shaped cross-section in the azimuth plane, since each antenna beam is generated by linear arrays 220 that point in opposite directions in the azimuth plane. The antenna beams are offset by 90 degrees with respect to each other in the azimuth plane, and may be similar to the antenna beams 104 shown in FIG. 2B (FIG. 2B shows the two antenna beams 104 generated at one of the two polarizations).

The low-band linear arrays 220 may be configured to support 4×MIMO operation. 4×MIMO refers to an operating mode in which an antenna transmits RF signals in a particular frequency band along four, generally orthogonal paths. Here, the low-band linear arrays 220 generate two peanut-shaped antenna beams at each of two different orthogonal polarizations, and hence may support 4×MIMO operation.

In other embodiments, two of the ports on the low-band radio may transmit and receive signals in a first sub-band within the low-band frequency range (e.g., all or part of the 710-787 MHz sub-band), while the other two ports on the low-band radio may transmit and receive signals in a second sub-band within the low-band frequency range (e.g., all or part of the 806-896 MHz sub-band). In such an embodiment, he base station antenna 200 will only implement 2×MIMO in the low-band, but will be able to transmit and receive signals in two different sub-bands of the low-band frequency range. The depths of the nulls 106 (see FIG. 2B) that are generated in the azimuth pattern at the corners where the edges of the first tubular reflector structure 212 meet are a function of frequency. Thus, while relatively deep nulls 106 may be present in the antenna beams generated by the mid-band and high-band linear arrays 230, 240 (resulting in the peanut-shaped pattern in the azimuth plane), the nulls 106 generated in the low-band may be much shallower. Thus, a somewhat omnidirectional pattern may be generated in the azimuth plane using a single pair of linear arrays 220 that are mounted on opposite sides of the tubular reflector structure 212. Accordingly, in some embodiments, the base station antenna 200 may implement 2×MIMO in two different sub-bands of the low-band.

Figure 6:
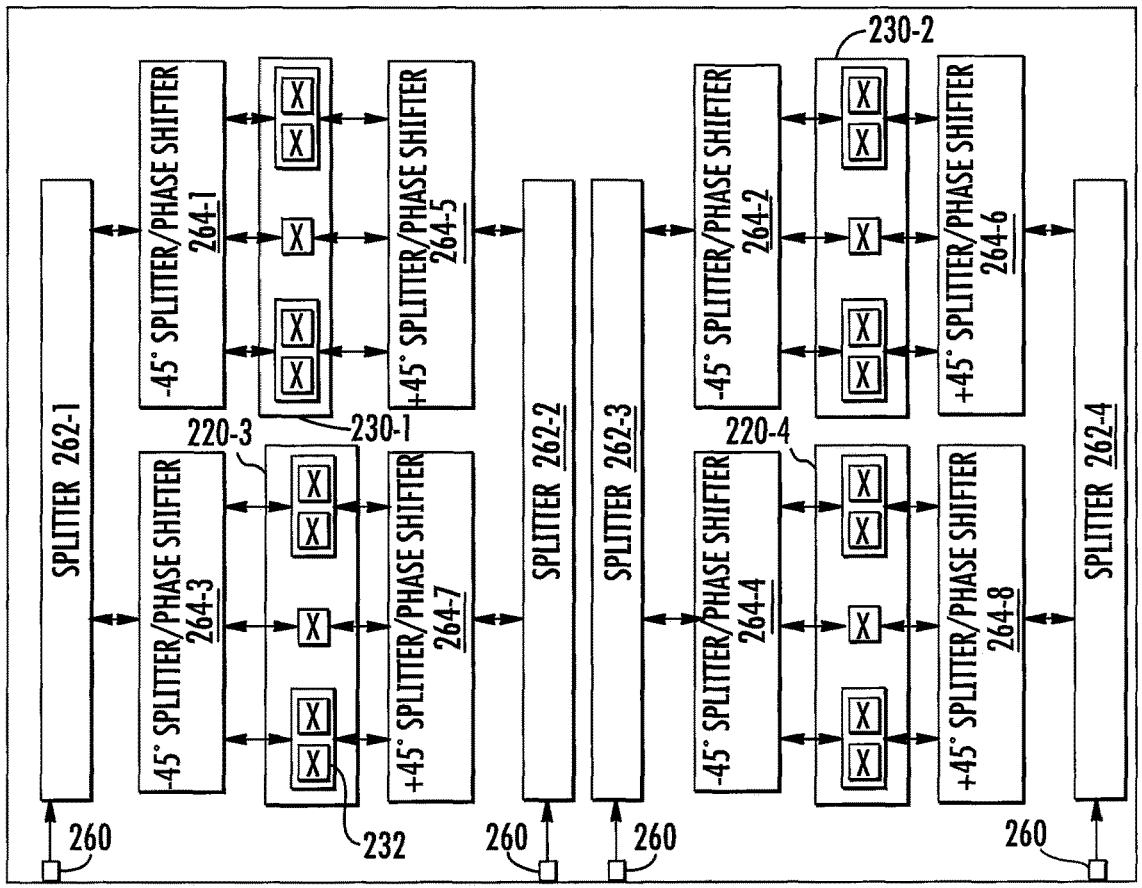

FIG. 6 illustrates an embodiment of a feed network that may be used to pass RF signals between a mid-band base station radio (not shown) and four of the eight mid-band linear arrays 230. The mid-band radio may be an internally-duplexed, four port device, and the radio ports may be connected to the four corresponding mid-band RF ports 260 on antenna 200.

As shown in FIG. 6 the mid-band feed network is similar to the low-band feed network discussed above with reference to FIG. 5. In particular, each mid-band RF port 260 is coupled to a respective 1×2 power splitter/combiner 262. Each 1×2 power splitter/combiner 262 is connected to two of the mid-band linear arrays 230 that are on opposed main faces of the second tubular reflector structure 216. Eight phase shifters 264 are provided, with each phase shifter 264 interposed between a respective one of the outputs of the four 1×2 power splitter/combiner 262 and the four mid-band linear arrays 230 (for each mid-band linear array 230, the first phase shifter 264 connects to the −45° dipole radiators 236 of the mid-band radiating elements 232 in the array 230 and the second phase shifter 264 connects to the +45° dipole radiators 236 of the mid-band radiating elements 232 in the array 230). Each phase shifter 264 may split the RF signals input thereto three ways (and the power split may be equal or unequal) and may apply a phase taper across the three sub-components of the RF signal to, for example, apply an electronic downtilt to the antenna beam that is formed when the sub-components of the RF signal are transmitted (or received) through the respective linear arrays 320. The mid-band linear arrays 320 may support 4×MIMO operation.

As discussed above, the base station antenna may include a total of eight mid-band linear arrays 230. The feed network shown in FIG. 6 may be used to support service in a first sub-band of the mid-band frequency range (e.g., the 1710-1785 MHz sub-band) using four of the mid-band linear arrays 230. The antenna 200 may include a second mid-band feed network that may be identical to the feed network shown in FIG. 6 that is used to support service in a second sub-band of the mid-band frequency range (e.g., the 1920-1980 MHz sub-band) using the remaining four of the mid-band linear arrays 230.

Figure 7:
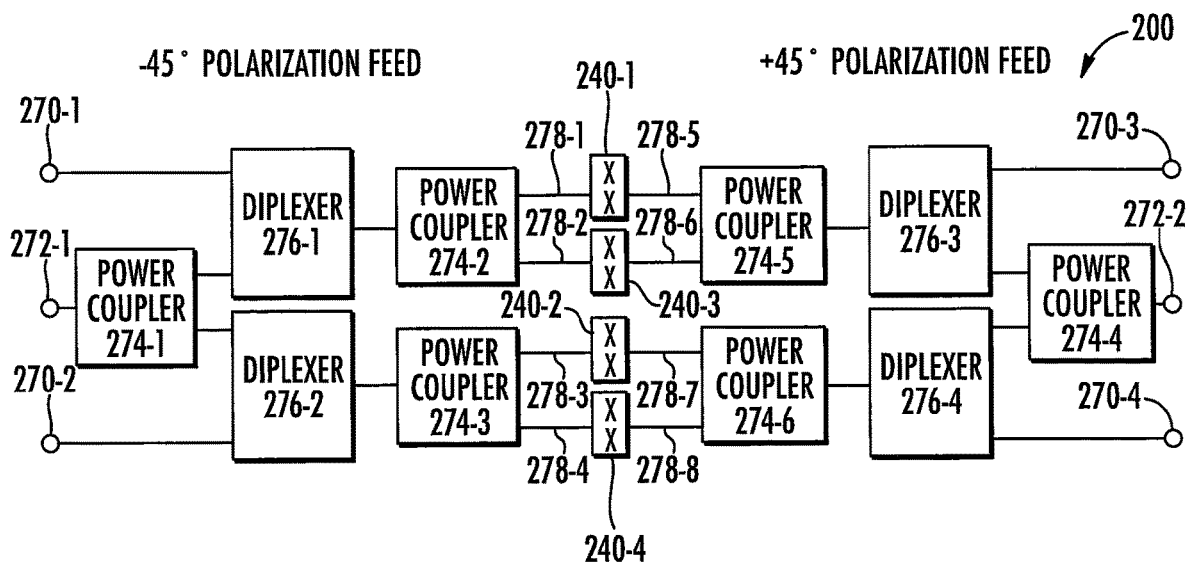

FIG. 7 illustrates an embodiment of a feed network that may be used to pass RF signals between a 3.5 GHz base station radio (not shown) and a 5 GHz base station radio (not shown) and the four linear arrays 240 of high-band radiating elements 242. The 3.5 GHz radio may have four ports, while the 5 GHz radio may have two ports, duplexing of the transmit and receive channels may be performed internal to the radios. The four 3.5 GHz radio ports may be connected to four 3.5 GHz RF ports 270-1, 270-2 that are included in the antenna 200, and the two 5 GHz radio ports may be connected to two 5 GHz RF ports 272-1, 272-2 that are included in the antenna 200.

As shown in FIG. 7, the high-band feed network 200 may include a total of eight outputs 278-1 through 278-8. Outputs 278-1 and 278-5 are coupled to linear array 240-1, outputs 278-2 and 278-6 are coupled to linear array 240-3, outputs 278-3 and 278-7 are coupled to linear array 240-2, and outputs 278-4 and 278-8 are coupled to linear array 240-4. The 3.5 GHz inputs 270-1, 270-2 may be connected to first inputs of first and second diplexers 276-1, 276-2. The 5 GHz input 272-1 is connected to an input of a first power coupler 274-1. The outputs of the first power coupler 278-1 may be connected to second inputs of the first and second diplexers 276-1, 276-2, respectively. The first and second diplexers 276-1, 276-2 may each receive both a 3.5 GHz signal and a 5 GHz signal and combine those signals and output the combined signals to respective second and third power couplers 274-2, 274-3. The outputs of second power coupler 274-2 may be supplied to the −45° dipole radiators 245, 246 of the radiating elements 242 of linear arrays 240-1, 240-3, respectively, and the outputs of third power coupler 274-3 may be supplied to the −45° dipole radiators 245, 246 of the radiating elements 242 of linear arrays 240-2, 240-4, respectively.

A first 3.5 GHz signal input at port 270-1 thus will pass to the −45° dipole radiators 245, 246 of the radiating elements 242 of linear arrays 240-1, 240-3 to generate a first antenna beam having a peanut-shaped cross-section in the azimuth plane, and a second 3.5 GHz signal input at port 270-2 will pass to the −45° dipole radiators 245, 246 of the radiating elements 242 of linear arrays 240-2, 240-4 to generate a second beam pattern having a peanut-shaped cross-section in the azimuth plane. A first 5 GHz signal input at port 272-1 will pass to the −45° dipole radiators 245, 246 of the radiating elements 242 of all four linear arrays 240-1 through 240-4 to generate an omnidirectional antenna beam in the azimuth plane. As shown in FIG. 7, the +45° dipole radiators may be fed in the exact same manner from 3.5 GHz input ports 270-3, 270-4 and 5 GHz input port 272-2 to form two additional peanut-shaped 3.5 GHz antenna beams and an additional omnidirectional 5 GHz antenna beam at the +45° polarization.

As described above, the base station antenna includes a reflector assembly 210 that comprises a pair of vertically stacked reflector structures 212, 216. Each reflector structure 212, 216 may has a different transverse cross-section (in the depicted embodiment, the first reflector structure 212 has a rectangular transverse cross-section, while the second reflector structure 216 has an octagonal transverse cross-section). Additionally, the respective perimeters of the transverse cross-sections of the first and second reflector structure may be different. Consequently, opposed main faces 214 of the first reflector structure 212 may be spaced apart by a first distance while opposed main faces 218 of the second reflector structure 216 may be spaced apart by a second distance that is different from the first distance. In some embodiments, the transverse cross-sections may be regular or irregular polygonal shapes, although embodiments of the present invention are not limited thereto.

The provision of a reflector assembly 210 that includes two or more vertically stacked reflector structures 212, 216 may provide a number of advantages over conventional reflector assemblies that include a single reflector structure. This can be seen with reference to FIGS. 8A and 8B, which illustrate example implementations of small cell base station antennas that each have a single reflector structure.

Figure 8A:
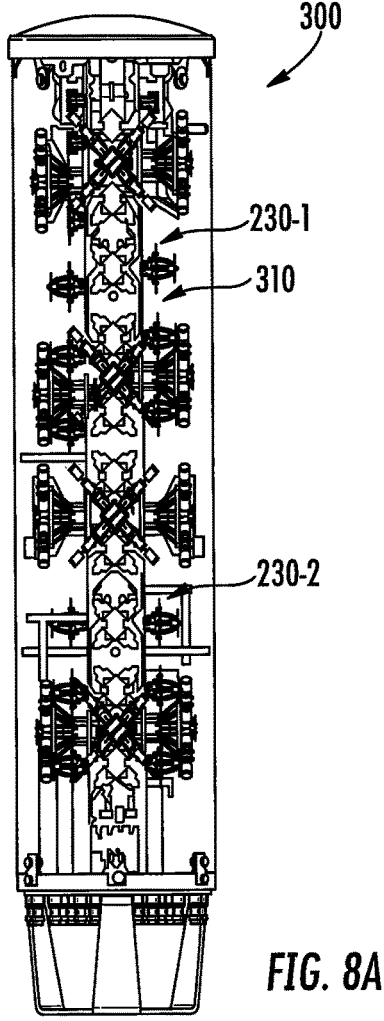
FIG. 8A is a schematic front view of an omnidirectional small cell base station antenna having a single reflector structure.

In particular, FIG. 8A illustrates a multi-band small cell antenna 300 that includes four linear arrays 220 of low-band radiating elements 222, eight linear arrays 230 of mid-band radiating elements 232, and four linear arrays 240 of high-band radiating elements 242 that are mounted on a single reflector structure 310 that includes a square transverse cross-section. The linear arrays and radiating elements are mostly not numbered in FIG. 8A to simplify the drawing, but correspond to the same components that are illustrated with reference numerals in FIG. 3A. As the reflector structure 310 only has four main faces, two mid-band linear arrays 230 are mounted on each main face of the reflector structure 310 in a vertically stacked arrangement. This arrangement extends the length of the antenna 300 considerably as compared to the base station antenna 200 according to embodiments of the present invention. In order to keep the diameter of the antenna 300 relatively small, the perimeter of the reflector structure 310 is kept small. This design, however, results in very little space in the interior of the antenna 300. If the antenna 300 includes remote electronic downtilt for the mid-band linear arrays 230, there may not be sufficient room within the interior of the reflector assembly 310 to mount the RET motors and the mechanical linkages that connect the RET motors to the phase shifters. Routing RF cables within the interior of the reflector structure may also be difficult. Moreover, as the length of the reflector assembly 310 is extended, the overall strength of the reflector assembly 310 is decreased. This may require the use of a thicker metal for the reflector assembly 310, or the addition of structural supports, both of which may increase the cost and weight of the antenna 300. Thus, the antenna 300 may be longer, heavier, and more expensive than the base station antenna 200, and may also be more difficult to implement as a remote electronic downtilt antenna. Note that antenna 300 includes four low-band radiating elements 222 per low-band array 220 as there is sufficient room for extra low-band radiating elements 222 in this design.

Figure 8B:
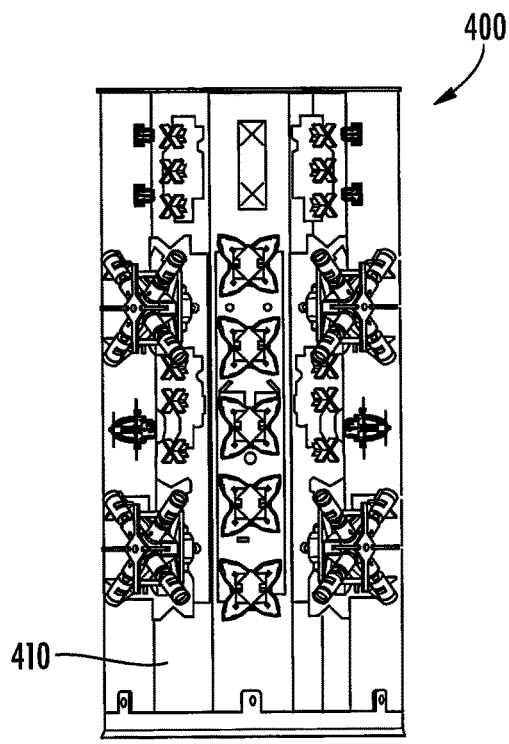
FIG. 8B is a schematic front view of another omnidirectional small cell base station antenna having a single reflector structure.

FIG. 8B illustrates a multi-band small cell antenna 400 that likewise includes four linear arrays 220 of low-band radiating elements 222, eight linear arrays 230 of mid-band radiating elements 232, and four linear arrays 240 of high-band radiating elements 242 that are mounted on a single reflector assembly 410 that has an octagonal transverse cross-section. The eight mid-band linear array 230 are mounted on the eight respective faces of the reflector structure 410. This allows the length of the antenna 400 to be shrunk considerably as compared to antenna 300. In order to maintain proper separation between adjacent mid-band linear arrays 230, the perimeter of the transverse cross-section of the reflector assembly 410 must be fairly large. When the low-band radiating elements 222, which are relatively tall, are mounted on the reflector assembly 410, the diameter of the antenna 400 is increases significantly compared to antenna 300. Unfortunately, the required diameter may exceed the diameter requirement that various cellular network operators specify for small cell base station antennas, due to the need to often mount these antennas on relatively small diameter utility poles.

The base station antenna 200 according to embodiments of the present invention overcome the above discussed disadvantages with the antennas 300 and 400 of FIGS. 8A-8B. In particular, the base station antenna 200 may have a diameter of 14.5 inches or less and a length of 39 inches or less. Moreover, as shown in FIG. 3D, the second reflector structure 216 may have a relatively large open interior. This may leave sufficient room for mounted RET units 290, mechanical linkages 292 and linkage plates 294 to be mounted within the interior of the antenna 200. The larger interior may also leave room for routing cables within the interior of the antenna. In addition, since the height of the antenna is reduced, the reflector structures may have sufficient strength without the use of thicker metal and/or separate support structures.

It will be appreciated that many different variants of the stacked reflector structures 212, 216 included in base station antenna 200 may be used, as appropriate, in other antenna designs. For example, FIGS. 9A-9E are schematic diagrams illustrating the transverse cross-sections of the stacked reflector structures of base station antennas according to further embodiments of the present invention.

Figure 9A:
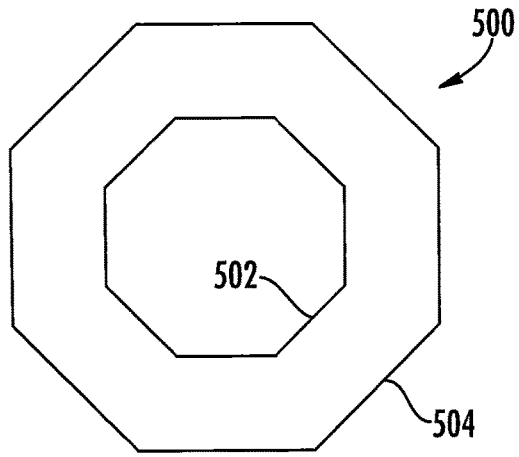
FIGS. 9A-9E are schematic transverse cross-sections of stacked reflector structures of small cell base station antennas according to further embodiments of the present invention.

As shown in FIG. 9A, in one such embodiment, a base station antenna 500 is provided that includes a reflector assembly having a first reflector structure 502 that has an octagonal transverse cross-section that is vertically stacked with respect to a second reflector structure 504 that has a larger octagonal transverse cross-section. An antenna having such a configuration could be, for example, identical to the base station antenna 200 described above, except that the four high-band linear arrays 240 could be moved to the four faces of the first reflector structure 502 that did not include low-band linear arrays 220. Such a design could reduce coupling between the low-band radiating elements 222 and the high-band radiating elements 242.

Figure 9B:
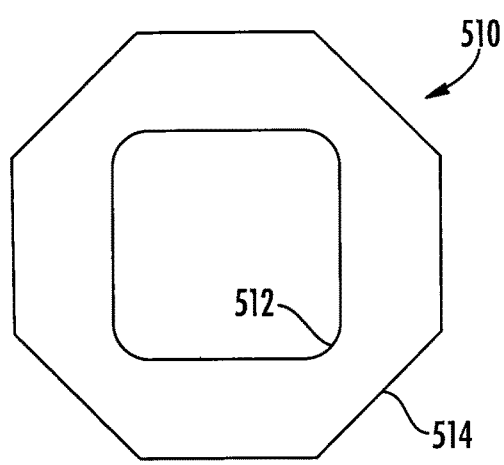

As shown in FIG. 9B, in another example embodiment, a base station antenna 510 is provided that includes a reflector assembly having a first reflector structure 512 that has a transverse cross-section in the shape of a rectangle with rounded corners that is vertically stacked with respect to a second reflector structure 514 that has an octagonal transverse cross-section. The perimeter of the transverse cross-section of the first reflector structure 512 is smaller than the perimeter of the transverse cross-section of the second reflector structure 514. An antenna having the configuration of FIG. 9B could be, for example, identical to the base station antenna 200 described above, except that the first reflector structure 512 has rounded corners and hence does not have a perfectly rectangular transverse cross-section. FIG. 9B illustrates that the reflector structures used in the antennas according to embodiments of the present invention need not have polygonal transverse cross-sections.

Figure 9C:
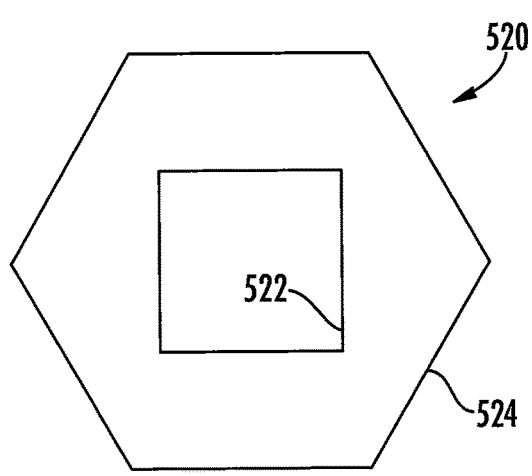

As shown in FIG. 9C, in another example embodiment, a base station antenna 520 is provided that includes a reflector assembly having a first reflector structure 522 that has a rectangular transverse cross-section that is vertically stacked with respect to a second reflector structure 524 that has a hexagonal transverse cross-section. The perimeter of the transverse cross-section of the first reflector structure 522 is smaller than the perimeter of the transverse cross-section of the second reflector structure 524. An antenna having the configuration of FIG. 9C could, for example, include a mid-band linear arrays 230 on each of the six faces of the second reflector structure 524 that are designed to cover most or all of a 120° sector in the azimuth plane. Three of the six mid-band linear arrays 230 that are on non-adjacent faces of the second reflector structure 524 may support service in a first sub-band of the mid-band frequency range and the other three of the six mid-band linear arrays 230 may support service in a second sub-band of the mid-band frequency range. Otherwise, the base station antenna 520 may be identical to the base station antenna 200 described above.

Figure 9D:
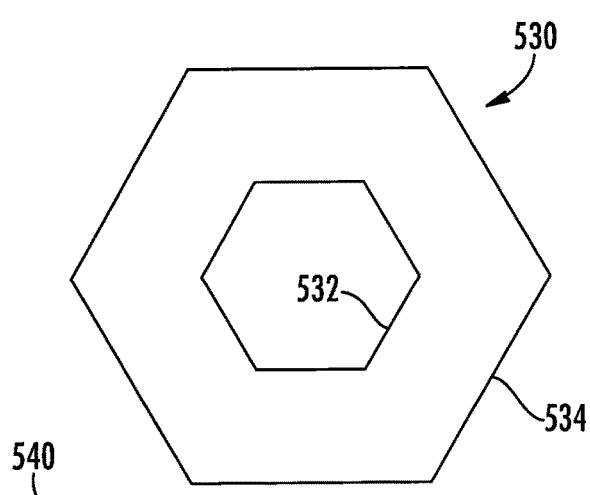

As shown in FIG. 9D, in still another example embodiment, a base station antenna 530 is provided that includes a reflector assembly having a first reflector structure 532 that has a hexagonal transverse cross-section that is vertically stacked with respect to a second reflector structure 534 that also has a hexagonal transverse cross-section. The perimeter of the transverse cross-section of the first reflector structure 532 is smaller than the perimeter of the transverse cross-section of the second reflector structure 534. An antenna having the configuration of FIG. 9D could, for example, include one low-band linear array 220 on three non-adjacent faces of the six faces of the first reflector structure 532 that are designed to cover most or all of a 120° sector in the azimuth plane, include one high-band linear array 240 on the remaining three faces of the first reflector structure 532, and include a mid-band linear array 230 on each of the six faces of the second reflector structure 534 that are designed to cover most or all of a 120° sector in the azimuth plane that are configured in the same manner as described above with reference to FIG. 9C.

Figure 9E:
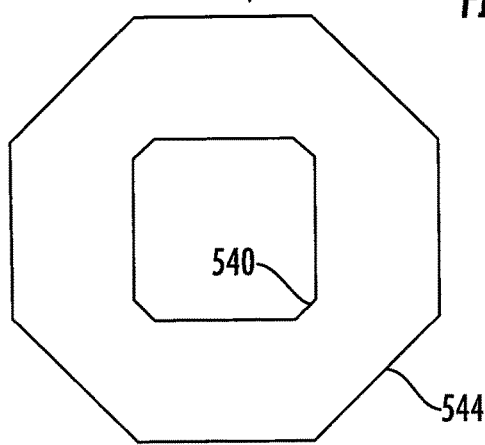

As shown in FIG. 9E, in still another example embodiment, a base station antenna 540 is provided that includes a reflector assembly having a first reflector structure 542 that has an irregular octagonal transverse cross-section that is vertically stacked with respect to a second reflector structure 514 that has an octagonal transverse cross-section. The antenna 540 may be identical to the antenna 510 discussed above, except for the slight change in the transverse cross-section of the first reflector structure 542. FIG. 9E illustrates that the reflector structures used in the antennas according to embodiments of the present invention may have transverse cross-sections that are irregular polygons.

Figure 10:
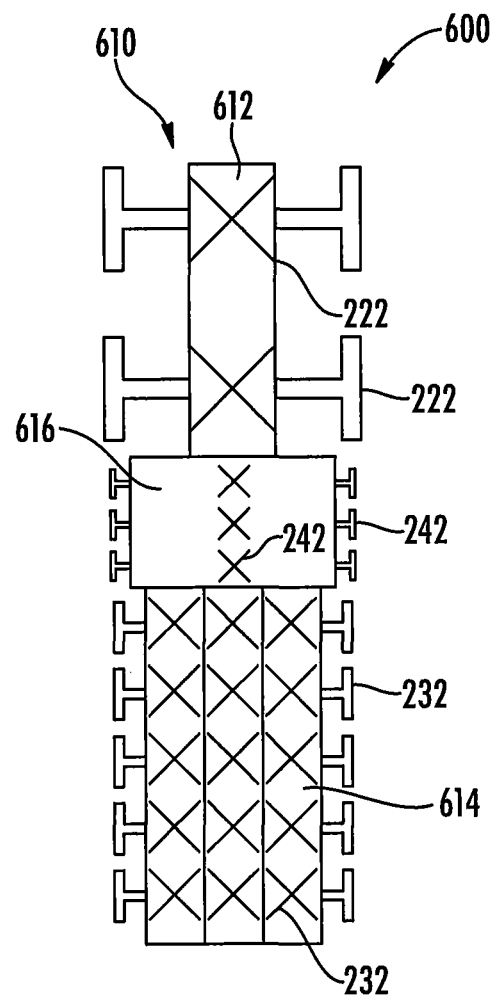
FIG. 10 is a schematic diagram of a base station antenna according to further embodiments of the present invention that includes three stacked reflector structures.

It will also be appreciated that in further embodiments of the present invention, base station antennas may be provided that include more than two vertically-stacked reflector structures. FIG. 10 illustrates one example embodiments of such an antenna. As shown in FIG. 10, a base station antenna 600 includes a reflector assembly 610 that has a first reflector structure 612, a second reflector structure 614 and a third reflector structure 616 that are stacked along a longitudinal axis. In this particular embodiment, the first reflector structure 612 has a rectangular transverse cross-section, the second reflector structure 614 has an octagonal transverse cross-section, and the third reflector structure 616 has a rectangular transverse cross-section. The perimeter of the third reflector structure 616 is larger than the perimeter of the second reflector structure 614, and the perimeter of the second reflector structure 614 is larger than the perimeter of the first reflector structure 612. The low-band radiating elements 222 are mounted as four arrays on the four respective faces of the first reflector structure 612, the mid-band radiating elements 232 are mounted as eight arrays on the eight respective faces of the second reflector structure 614, and the high-band radiating elements 242 are mounted as four arrays on the four respective faces of the third reflector structure 616. The antenna 600 may be almost identical to the base station antenna 200 described above, except that the antenna 600 includes a separate reflector structure 616 having a larger transverse cross-section for the high-band radiating elements 642. The larger transverse cross-section of the third reflector structure 616 may advantageously place the high-band radiating elements 242 closer to the radome (not shown), which may improve the performance thereof, and may also create additional space in the interior of the antenna that can be used, for example, to mount RET units for either the low-band or high-band arrays.

It will appreciated that many modifications may be made to the antennas described above without departing from the scope of the present invention. As one example, the various arrays of radiating elements are illustrated as vertically-oriented linear arrays in the above embodiments. It will be appreciated, however, that staggered linear arrays may alternatively be used as disclosed, for example, in U.S. Provisional Patent Application Ser. No. 62/722,238, filed Aug. 24, 2018, the entire content of which is incorporated herein by reference, or that planar arrays of radiating elements may be used in other embodiments in place of the linear arrays shown in the drawings. As another example, while the high-band arrays are shown in the above embodiments as being mounted on the same reflector structure as the low-band arrays, in other embodiments the high-band arrays and the mid-band arrays may be mounted on the same reflector structure.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

What is claimed is:

1. A base station antenna, comprising:
   a first reflector structure that extends about a first longitudinal axis, the first reflector structure having a first transverse cross-section;
   a second reflector structure that extends about a second longitudinal axis, the second reflector structure having a second transverse cross-section that is different from the first transverse cross-section, wherein the first and second reflectors are vertically stacked;
   a first array of first frequency band radiating elements that are mounted to extend outwardly from the first reflector structure;
   a second array of second frequency band radiating elements that are mounted to extend outwardly from the second reflector structure, the first frequency band being non-overlapping with the second frequency band; and
   a radome that extends around the first reflector structure and the second reflector structure.

2. The base station antenna of claim 1, wherein the first longitudinal axis and the second longitudinal axis are substantially collinear.

3. The base station antenna of claim 1, wherein the first transverse cross-section or the second transverse cross-section is an octagonal transverse cross-section.

4. The base station antenna of claim 3, wherein the other of the first or second transverse cross-section is a rectangular transverse cross-section.

5. The base station antenna of claim 1, wherein a first perimeter of the first transverse cross-section is different than a second perimeter of the second transverse cross-section.

6. The base station antenna of claim 5, wherein the second frequency band is at higher frequencies than the first frequency band, and wherein the second perimeter is greater than the first perimeter.

7. The base station antenna of claim 6, further comprising a third array of third frequency band radiating elements that are mounted to extend outwardly from the first reflector structure, the third frequency band being non-overlapping with both the first frequency band and the second frequency band.

8. The base station antenna of claim 7, wherein the second transverse cross-section is an octagonal transverse cross-section and the first transverse cross-section is a rectangular transverse cross-section.

9. The base station antenna of claim 1, further comprising a third array of radiating elements that are mounted to extend outwardly from the first reflector structure, wherein the first and third arrays of radiating elements are configured to generate a first antenna beam that has a peanut-shaped cross-section in the azimuth plane.

10. A base station antenna, comprising:
    a first reflector structure having first and second generally opposed sides;
    a first array of radiating elements that are mounted to extend outwardly from the first side of the first reflector structure and a second array of radiating elements that are mounted to extend outwardly from the second side of the first reflector structure;
    a second reflector structure having third and fourth generally opposed sides; and
    a third array of radiating elements that are mounted to extend outwardly from the third side of the second reflector structure and a fourth array of radiating elements that are mounted to extend outwardly from the fourth side of the second reflector structure,
    wherein the first side is a first distance from the second side and the third side is a second distance from the fourth side, and
    wherein the second distance is different from the first distance.

11. The base station antenna of claim 10, wherein the first reflector structure and the second reflector structure each extend along a common longitudinal axis, and wherein the base station antenna further comprises a radome that extends about the first reflector and the second reflector and is configured so that the first array, the second array, the third array and the fourth array reside inside the radome.

12. The base station antenna of claim 10, wherein the first reflector structure has a first transverse cross-section and the second reflector structure has a second transverse cross-section that is different from the first transverse cross-section.

13. The base station antenna of claim 12, wherein the first transverse cross-section is a rectangular transverse cross-section and the second transverse cross-section is an octagonal transverse cross-section.

14. The base station antenna of claim 12, wherein a first perimeter of the first transverse cross-section is different than a second perimeter of the second transverse cross-section.

15. The base station antenna of claim 14, wherein the first array of radiating elements are configured to operate in a first frequency band and the second array of radiating elements are configured to operate in a second frequency band that is at higher frequencies than the first frequency band, and wherein the second perimeter is greater than the first perimeter.

16. The base station antenna of claim 10, wherein the first reflector structure has a first transverse cross-section and the second reflector structure has a second transverse cross-section, and wherein the first transverse cross-section is an octagonal transverse cross-section and the second transverse cross-section is an octagonal transverse cross-section.

17. A base station antenna, comprising:
a first reflector structure having first and second generally opposed sides;
a first array of radiating elements that are mounted to extend outwardly from the first side of the first reflector structure and a second array of radiating elements that are mounted to extend outwardly from the second side of the first reflector structure;
a second reflector structure having third and fourth generally opposed sides;
a third array of radiating elements that are mounted to extend outwardly from the third side of the second reflector structure and a fourth array of radiating elements that are mounted to extend outwardly from the fourth side of the second reflector structure; and
a fifth array of radiating elements mounted to extend outwardly from the first reflector structure,
wherein the first side is a first distance from the second side and the third side is a second distance from the fourth side, and
wherein the second distance is different from the first distance,
wherein the first reflector structure has a first transverse cross-section and the second reflector structure has a second transverse cross-section that is different from the first transverse cross-section,
wherein a first perimeter of the first transverse cross-section is different than a second perimeter of the second transverse cross-section,
wherein the first array of radiating elements are configured to operate in a first frequency band and the second array of radiating elements are configured to operate in a second frequency band that is at higher frequencies than the first frequency band, wherein the fifth array of radiating elements are configured to operate in a third frequency band that is at higher frequencies than the second frequency band, and wherein the second perimeter is greater than the first perimeter.

18. A base station antenna, comprising:
a first reflector structure that extends along a first longitudinal axis and that has a transverse cross-section having a first perimeter;
a plurality of arrays of first frequency band radiating elements that are mounted to extend outwardly from respective sides of the first reflector structure;
a second reflector structure that extends along a second longitudinal axis and that has a transverse cross-section having a second perimeter that is different from the first perimeter; and
a plurality of arrays of second frequency band radiating elements that are mounted to extend outwardly from respective sides of the second reflector structure, the first and second frequency band radiating elements having different configurations.

19. The base station antenna of claim 18, wherein the first reflector structure and the second reflector structure each extend along a common longitudinal axis, and wherein the first and second reflector have a configuration that extends entirely about and thereby encloses the longitudinal axis.

20. The base station antenna of claim 19, wherein the transverse cross-section of the first reflector structure is a rectangular transverse cross-section and the transverse cross-section of the second reflector structure is an octagonal transverse cross-section.

21. The base station antenna of claim 18, wherein the first array of radiating elements are configured to operate in a first frequency band and the second array of radiating elements are configured to operate in a second frequency band that is at higher frequencies than the first frequency band, wherein the second perimeter is greater than the first perimeter, and wherein the base station antenna further comprises a radome that extends about the first reflector and the second reflector.

22. A base station antenna, comprising:
a first reflector structure that extends along a first longitudinal axis and that has a transverse cross-section having a first perimeter;
a plurality of arrays of first frequency band radiating elements that are mounted to extend outwardly from respective sides of the first reflector structure;
a second reflector structure that extends along a second longitudinal axis and that has a transverse cross-section having a second perimeter that is different from the first perimeter; and
a plurality of arrays of second frequency band radiating elements that are mounted to extend outwardly from respective sides of the second reflector structure, the first and second frequency band radiating elements having different configurations; and
a third array of radiating elements that are configured to operate in a third frequency band, wherein the third array is mounted to extend outwardly from the first reflector structure,
wherein the first array of radiating elements are configured to operate in a first frequency band and the second array of radiating elements are configured to operate in a second frequency band that is at higher frequencies than the first frequency band, wherein the third frequency band is at higher frequencies than the second frequency band, and wherein the second perimeter is greater than the first perimeter.

* * * * *